(12) United States Patent
Virnelson et al.

(10) Patent No.: US 9,951,252 B2
(45) Date of Patent: Apr. 24, 2018

(54) MOISTURE-CURABLE FUEL-RESISTANT SEALANT SYSTEMS

(71) Applicant: PRC-DeSoto International, Inc., Sylamar, CA (US)

(72) Inventors: Bruce Virnelson, Valencia, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 206 days.

(21) Appl. No.: 14/822,123

(22) Filed: Aug. 10, 2015

(65) Prior Publication Data

US 2017/0044399 A1    Feb. 16, 2017

(51) Int. Cl.
| | |
|---|---|
| C09D 181/02 | (2006.01) |
| C09D 181/04 | (2006.01) |
| B05D 7/00 | (2006.01) |
| B64G 1/00 | (2006.01) |
| F16B 47/00 | (2006.01) |

(52) U.S. Cl.
CPC ........... *C09D 181/04* (2013.01); *B64G 1/00* (2013.01); *C09D 181/02* (2013.01); *F16B 47/003* (2013.01); *B05D 7/54* (2013.01)

(58) Field of Classification Search
CPC ...... B05D 7/54; C09D 181/02; C09D 181/04; B64G 1/00; F16B 47/003
See application file for complete search history.

(56) References Cited

U.S. PATENT DOCUMENTS

| | | | |
|---|---|---|---|
| 4,366,307 A | 12/1982 | Singh et al. | |
| 4,609,762 A | 9/1986 | Morris et al. | |
| 4,623,711 A | 11/1986 | Morris et al. | |
| 5,126,421 A | 6/1992 | Majewski et al. | |
| 5,189,176 A | 2/1993 | Blum et al. | |
| 5,206,200 A | 4/1993 | Bush et al. | |
| 5,225,472 A | 7/1993 | Cameron et al. | |
| 5,235,062 A * | 8/1993 | Greco ................. | C07D 263/04 548/215 |
| 5,747,627 A | 5/1998 | Kimura et al. | |
| 6,172,179 B1 | 1/2001 | Zook et al. | |
| 6,372,849 B2 * | 4/2002 | DeMoss ............... | C08G 75/045 525/191 |
| 6,509,418 B1 | 1/2003 | Zook et al. | |
| 6,525,168 B2 | 2/2003 | Zook et al. | |
| 7,009,032 B2 | 3/2006 | Bojkova et al. | |
| 7,879,955 B2 | 2/2011 | Rao et al. | |
| 8,092,128 B1 | 1/2012 | Bray et al. | |
| 8,869,579 B2 | 10/2014 | Bray et al. | |
| 2002/0010272 A1 * | 1/2002 | Mahdi .................... | C08G 18/10 525/100 |
| 2004/0152866 A1 | 8/2004 | Cosman | |
| 2004/0220327 A1 | 11/2004 | Cosman et al. | |
| 2005/0010003 A1 | 1/2005 | Sawant et al. | |
| 2006/0270796 A1 | 11/2006 | Sawant et al. | |
| 2007/0173602 A1 | 7/2007 | Brinkman et al. | |
| 2007/0287810 A1 | 12/2007 | Rao et al. | |
| 2008/0194720 A1 | 8/2008 | Stappers et al. | |
| 2010/0010133 A1 | 1/2010 | Zook et al. | |
| 2010/0041839 A1 | 2/2010 | Anderson et al. | |
| 2011/0009557 A1 | 1/2011 | Lin | |
| 2012/0040104 A1 | 2/2012 | Keledjian et al. | |
| 2012/0067249 A1 * | 3/2012 | Woods .................. | C07F 7/1836 106/287.25 |
| 2012/0121359 A1 | 5/2012 | Bray et al. | |
| 2012/0168055 A1 | 7/2012 | Bray et al. | |
| 2012/0234205 A1 | 9/2012 | Hobbs et al. | |
| 2012/0234255 A1 | 9/2012 | Bernardini et al. | |
| 2012/0238707 A1 | 9/2012 | Hobbs et al. | |
| 2012/0238708 A1 | 9/2012 | Hobbs et al. | |
| 2012/0277382 A1 | 11/2012 | Booth et al. | |
| 2013/0079485 A1 | 3/2013 | Cai et al. | |
| 2013/0181161 A1 | 7/2013 | Pajel et al. | |
| 2013/0344251 A1 | 12/2013 | Cai et al. | |
| 2013/0344253 A1 | 12/2013 | Abrami et al. | |
| 2013/0345371 A1 | 12/2013 | Anderson et al. | |
| 2013/0345389 A1 | 12/2013 | Cai et al. | |
| 2011/0319559 A1 | 9/2014 | Rao et al. | |
| 2014/0275461 A1 | 9/2014 | Rao et al. | |
| 2014/0275474 A1 | 9/2014 | Rao et al. | |
| 2014/0378650 A1 | 12/2014 | Rao et al. | |
| 2015/0099858 A1 | 4/2015 | Cai et al. | |
| 2015/0119549 A1 | 4/2015 | Rao et al. | |

FOREIGN PATENT DOCUMENTS

| | | | |
|---|---|---|---|
| EP | 0499188 A1 | | 8/1992 |
| GB | 1298583 | * | 12/1972 |
| JP | H0236220 A | | 2/1990 |
| JP | 2000-509758 A | | 8/2000 |
| WO | 96/08308 A1 | | 3/1996 |
| WO | 98/39365 A2 | | 9/1998 |
| WO | 99/07762 A1 | | 2/1999 |
| WO | 2005/056704 A1 | | 6/2005 |

* cited by examiner

*Primary Examiner* — Patrick D Niland
(74) *Attorney, Agent, or Firm* — William R. Lambert

(57) ABSTRACT

Sealant systems that are pre-applied to a part to be sealed include a layer of an uncured moisture-curable sealant and a frangible barrier coating applied over the uncured moisture-curable sealant. During assembly, the barrier coating breaks to expose the moisture-curable sealant to moisture to initiate the curing reaction. The moisture-curable sealant systems are suitable for aerospace applications and include sulfur-containing prepolymers. Various curing chemistries can be used.

20 Claims, No Drawings

MOISTURE-CURABLE FUEL-RESISTANT SEALANT SYSTEMS

FIELD

The present disclosure relates to sealant systems that include a one-part moisture-curable sulfur-containing prepolymer composition. The compositions can be used with a barrier coat such that when the integrity of the barrier coat is compromised, exposure to atmospheric moisture causes the sulfur-containing prepolymer to cure. The one-part moisture curable compositions are useful with pre-coated parts.

BACKGROUND

Joints between surfaces of aircraft parts such as fasteners must be sealed to prevent fuel leakage. Aerospace sealants can be provided as two-component systems that must be mixed immediately prior to use or can be provided as pre-mixed one-component systems that are stored at low temperature, have a limited shelf live, and exhibit a typical working time of less than 48 hours. The sealants are typically applied by hand to pre-cleaned surfaces after which excess sealant must be removed. The process is time consuming, costly, and can result in variable seal integrity.

To address these issues, pre-applied sealant systems have been developed in which an unreacted moisture-curable sealant composition is applied to a surface of a part such as a fastener and a barrier coating is applied over the uncured moisture-curable sealant composition to prevent exposure to moisture and thereby prevent curing of the composition. The barrier coating prevents egress of moisture to the uncured composition and also serves to maintain the uncured viscous sealant composition in place. During installation of the part, the stress applied during assembly compromises or breaks the frangible barrier coating, causing the viscous sealant to flow between adjoining surfaces and exposes the uncured sealant composition to atmospheric moisture and thereby initiate sealant curing.

Moisture-curable sealant compositions have been developed that include silyl-blocked thiol-terminated polythioether and an epoxy curing agent. Moisture curable silyl-blocked thiol-terminated polysulfide and polythioether compositions are disclosed, for example, in U.S. Application Publication Nos. 2012/0121359 and 2012/0168055. When exposed to moisture, the silyl group hydrolyzes to provide a thiol-terminated prepolymer, which in the presence of an epoxy curing agent, crosslinks to form a cured sealant. In the self-sealing fasteners disclosed in these publications, the moisture-curable sealant composition is applied to a portion of the fastener to be sealed and a barrier coating is applied over the sealant composition to prevent moisture from reaching the sealant composition prior to assembly using the part.

Moisture-curable sulfur-containing prepolymer sealant compositions suitable for use in aerospace sealant applications are disclosed, for example, in U.S. Application Publication Nos. 2013/0345389, 2013/0344251, 2011/0009557, and 2013/0181161, and in U.S. application Ser. No. 14/200, 687 filed on Mar. 7, 2014, each of which is incorporated by reference in its entirety.

Pre-applied moisture-curable sealant systems using alternative chemistries are desired.

SUMMARY

One-part moisture-curable sealant compositions suitable for pre-applied assembly applications cure rapidly in the presence of moisture are disclosed.

Aspects of the present invention include a sealant system comprising: an uncured moisture-curable layer comprising: a sulfur-containing prepolymer; and an encapsulated tin catalyst, a blocked reactive amine, encapsulated water, a bis-oxazolidine, a water activated acid, or a blocked amine catalyst; and a frangible barrier coating overlying the moisture-curable sealant layer.

Aspects of the present invention also include coated parts comprising a sealant system comprising an uncured moisture-curable sealant layer comprising a sulfur-containing prepolymer; and a frangible barrier coating overlying the moisture-curable sealant layer applied to at least a portion of a part.

Aspects of the present invention also include methods of providing coated parts, comprising applying a moisture-curable sealant layer comprising a sulfur-containing prepolymer to at least a portion of a surface of a part; and applying a frangible barrier coating over the moisture-curable sealant layer, wherein the barrier coating is configured to expose the moisture-curable composition to atmospheric moisture during assembly.

DETAILED DESCRIPTION

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —$CONH_2$ is attached through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. For example, an alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methanediyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. For example, each cycloalkyl and/or cycloalkanediyl group(s) can be $C_{3-6}$, $C_{5-6}$, cyclohexyl or cyclohexanediyl. For example, each alkyl and/or alkanediyl group (s) can be $C_{1-6}$, $C_{1-4}$, $C_{1-3}$, methyl, methanediyl, ethyl, or ethane-1,2-diyl. A alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, tetradecyl, and the like. An alkyl group can be $C_{1-6}$ alkyl, $C_{1-4}$ alkyl, or $C_{1-3}$ alkyl. It will be appreciated that a branched alkyl has at least three carbon atoms.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl, and cyclohexane-1,2-diyl.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

As used herein, "polymer" refers to oligomers, homopolymers, and copolymers, which may be cured or uncured. Unless stated otherwise, molecular weights are number average molecular weights for polymeric materials indicated as "$M_n$" as determined, for example, by gel permeation chromatography using a polystyrene standard in an art-recognized manner. Unless stated otherwise, molecular weights are number average molecular weights for polymeric materials indicated as "Mn" as may be determined, for example, by gel permeation chromatography using a polystyrene standard in an art-recognized manner.

"Prepolymers" refer to polymers prior to curing. In general, prepolymers provided by the present disclosure are liquid at room temperature. "Adducts" refer to prepolymers that are functionalized with a reactive terminal group; however, prepolymers may also contain terminal functional group. Thus, the terms prepolymer and adduct are used interchangeably. The term adduct is often used to refer to a prepolymer that is an intermediate in a reaction sequence used to prepare a prepolymer.

Reference is now made in detail to systems, compounds, compositions, and methods. The disclosed embodiments are not intended to be limiting of the claims. To the contrary, the claims are intended to cover all alternatives, modifications, and equivalents.

Pre-Applied Sealant Systems

A sealant systems provided by the present disclosure comprise an uncured moisture-curable sealant layer comprising a sulfur-containing prepolymer; and an encapsulated tin catalyst, a blocked reactive amine, encapsulated water, a bis-oxazolidine, a water activated acid, or a blocked amine catalyst; and a frangible barrier coating overlying the moisture-curable sealant layer.

At least one component of the moisture-curable sealant compositions provided by the present disclosure becomes reactive or catalytic in the presence of moisture. For example, a sulfur-containing prepolymer may be terminated with polyalkoxysilyl groups that hydrolyze and condense in the presence of moisture. In other examples, a moisture-curable composition may include encapsulated water that can be released from the encapsulant during assembly to initiate the curing reaction. As another example, the composition may contain a blocked catalyst that reacts with water to release an active catalyst. In other examples, a composition may comprise a blocked reactive polyamine that unblocks in the presence of moisture to release a polyamine that reacts with reactive groups of the sulfur-containing prepolymer. The source of water used to initiate the curing reaction can come from ambient moisture and/or can be derived from encapsulated water incorporated into the moisture-curable composition.

Sealant systems provided by the present disclosure include an uncured moisture-curable sealant and an overlying barrier coating. The uncured moisture-curable sealant can be applied over a part to be sealed such as a screw, fastener, panel, rivet, or any other part in which a stress can be applied to the overlying barrier coating sufficient to compromise or break the barrier coating during assembly of the coated part.

A moisture-curable sealant includes a sulfur-containing prepolymer and can include a curing agent reactive with the sulfur-containing prepolymer. A sulfur-containing prepolymer may be unblocked or may be blocked with a moisture-reactive group that unblocks the sulfur-containing prepolymer in the presence of moisture to expose a reactive functional group.

When stress is applied to the coating system, the forces can break, fracture, or otherwise compromise the barrier coating and/or release a latent catalyst or reactant such as water.

A moisture-curable sealant composition can include an encapsulated catalyst and/or encapsulated water. When stress, such as mechanical stress during an assembly operation, is applied to the sealant system, the encapsulated catalyst or encapsulated water can be released from the encapsulant to mix with the prepolymer and curing agent and initiate curing of the sealant system.

The overlying barrier coating retains the viscous moisture-curable sealant in place on the part and can serve as a moisture barrier as well as a physical barrier. The moisture-curable sealant can be a viscous liquid at storage and use temperatures and the barrier coating maintains the sealant against a part at the intended location.

Sealant Compositions

One-part moisture-curable sealant compositions suitable for pre-applied assembly applications cure rapidly in the presence of moisture. The moisture can be atmospheric moisture or can be source of encapsulated moisture or water incorporated into the sealant composition. For aerospace sealant applications, compositions contain a sulfur-containing prepolymer. A sulfur-containing prepolymer can be terminated in a suitable reactive functional group depending on the curing chemistry. Moisture can initiate a condensation reaction, participate in the curing reaction, or unblock a reactive component such as a catalyst or a co-reactant. One-part moisture-curable sealant compositions can exhibit long shelf life and rapid cure time following exposure to moisture.

Uncured Moisture-Curable Compositions

A one-part moisture-curable compositions provided by the present disclosure can comprise:
- a polyalkoxysilyl-terminated sulfur-containing prepolymer and an encapsulated tin catalyst;
- an epoxy-terminated sulfur-containing prepolymer and a blocked reactive polyamine;
- an isocyanate-terminated sulfur-containing prepolymer and a blocked reactive polyamine;
- a thiol-terminated sulfur-containing prepolymer, a metal oxide catalyst, and encapsulated water;
- an isocyanate-terminated sulfur-containing prepolymer and encapsulated water;
- an epoxy- or isocyanate-terminated sulfur-containing prepolymer and bis-oxazolidine curing agent;
- a vinyl ether-terminated sulfur-containing prepolymer and water-activated acid; and
- a Michael acceptor-terminated sulfur-containing prepolymer and a moisture-released amine catalyst.

Polyalkoxysilyl-Terminated Prepolymer and Encapsulated Tin Catalyst

A moisture-curable sealant composition can include a polyalkoxysilyl-terminated sulfur-containing prepolymer and an encapsulated tin catalyst. Upon application of energy, such as thermal or mechanical energy, the sealant composition is exposed to atmospheric moisture and the tin catalyst is released from the encapsulant to catalyze the reaction of the terminal polyalkoxysilyl groups with water.

Polyalkoxysilyl-terminated sulfur-containing prepolymers provided by the present disclosure can hydrolyze in the presence of water and self-polymerize via condensation. Moisture reacts with the polyalkoxysilyl groups of the prepolymer replacing the hydrolysable and condensable groups on the Si atom with hydroxyl groups, which in the presence of a tin catalyst condense to provide a cured sealant.

Catalysts useful for the condensation reaction of the polyalkoxysilyl-terminated prepolymers include organotitanium compounds such as tetraisopropoxy titanium, tetra-tert-butoxy titanium, titanium di(isopropoxy)bis(ethylacetoacetate), and titanium di(isopropoxy)bis(acetylacetoacetate); organic tin compounds such as dibutyltin dilaurate, dibutyltin bisacetylacetoacetate, and tin octylate; metal dicarboxylates such as lead dioctylate; organozirconium compounds such as zirconium tetraacetyl acetonate; and organoaluminum compounds such as aluminum triacetyl-acetonate. Other examples of suitable catalysts for moisture-curing of silyl groups include diisopropoxy bis(ethyl acetoacetonate)titanium, diisopropoxy bis(acetyl acetonate)titanium, and dibutoxy bis(methyl acetoacetonate)titanium.

Suitable moisture-curable sealant compositions comprising polyalkoxysilyl-terminated sulfur-containing prepolymers are disclosed, for example, U.S. application Ser. No. 14/200,569 filed on Mar. 7, 2015, which is incorporated by reference in its entirety.

Epoxy-Terminated Prepolymer and Blocked Reactive Polyamine

A moisture-curable sealant composition can include an epoxy-terminated sulfur-containing prepolymer and a blocked reactive polyamine. Upon exposure to moisture, water can react with the blocked reactive polyamine to provide an unblocked reactive polyamine, which then reacts with the epoxy-terminated sulfur-containing prepolymer to provide a cured sealant.

An epoxy-terminated sulfur-containing prepolymer may be an epoxy-terminated polythioether prepolymer, an epoxy-terminated polysulfide prepolymer, an epoxy-terminated sulfur-containing polyformal prepolymer, or a combination of any of the foregoing. Epoxy-terminated sulfur-containing prepolymers are disclosed, for example, in U.S. Application Publication Nos. 2005/0010003 and 2007/0287810, each of which is incorporated by reference in its entirety.

A blocked amine curing agent can comprise a ketimine. Ketimines can be formed by the reaction between aliphatic polyamines such as diethylenetriamine (DTA), triethylenetetramine (TTA), tetraethylenepentamine (TEPA), dipropenediamine (DPDA), and m-xylenediamine (m-XDA) and a ketone such as methylethyl ketone (MEK) and isobutylketone (MIBK). Ketimines react with water to generate reactive amines. A tin catalyst can be used to catalyze the hydrolysis of the blocked reactive polyamine. Other suitable blocked amine curing agents include aldimines, enamines, and oxazolidines. Suitable blocked reactive polyamines are disclosed, for example, in U.S. Pat. No. 5,206,200.

Isocyanate-Terminated Prepolymer and Blocked Reactive Polyamine

A moisture-curable composition can include an isocyanate-terminated sulfur-containing prepolymer and a blocked amine curing agent. Upon exposure to moisture, water can react with the blocked reactive polyamine to provide an unblocked reactive polyamine, which reacts with the isocyanate-terminated sulfur-containing prepolymer to provide a cured sealant.

An isocyanate-terminated sulfur-containing prepolymer may comprise an isocyanate-terminated polythioether prepolymer, an isocyanate-terminated polysulfide prepolymer, an isocyanate-terminated sulfur-containing polyformal prepolymer, or a combination of any of the foregoing.

Isocyanate-terminated sulfur-containing prepolymers are disclosed, for example, in U.S. Application Publication Nos. 2013/0079485, 2012/0238708, 2012/0238707, and 2013/0344253, each of which is incorporated by reference in its entirety.

Thiol-Terminated Prepolymer, Metal Oxide Catalyst, and Encapsulated Water

A moisture-curable composition can include a thiol-terminated sulfur-containing prepolymer, a metal oxide catalysts such as manganese dioxide, and encapsulated water. The metal oxide-catalyzed self-condensation of the thiol-terminated sulfur-containing prepolymer is initiated by water. The water may be encapsulated and/or may be ambient moisture. Upon application of physical or mechanical stress such as applied during assembly, water can be released from the encapsulant to initiate the metal oxide-catalyzed self-condensation reaction.

A metal oxide serves as an oxidizing agent capable of oxidizing terminal mercaptan groups of the sulfur-containing polymer to form disulfide bonds. Suitable metal oxides include, for example, lead dioxide, manganese dioxide, calcium dioxide, sodium perborate monohydrate, calcium peroxide, zinc peroxide, and dichromate.

Thiol-terminated sulfur-containing prepolymer compositions comprising metal oxides are disclosed, for example, in U.S. Application Publication Nos. 2004/0220327 and 2004/0152866, each of which is incorporated by reference in its entirety.

Isocyanate-Terminated Prepolymer and Encapsulated Water

A moisture-curable composition can include an isocyanate-terminated sulfur-containing prepolymer and encapsulated water. Upon exposure to water released from the encapsulant during assembly, the isocyanate-terminated sulfur-containing prepolymer can react with water to form the corresponding amine. The amine-terminated sulfur-containing prepolymer then reacts with the unreacted isocyanate-terminated sulfur-containing prepolymer to form a cured polyurea sealant.

Examples of isocyanate-terminated sulfur-containing prepolymers are disclosed, for example, in U.S. Application Publication Nos. 2013/0079485, 2012/0238708, 2012/0238707, and 2013/0344253, each of which is incorporated by reference in its entirety.

Isocyanate- or Epoxy-Terminated Prepolymer and Bis-Oxazolidine Curing Agent

A moisture-curable composition can include an isocyanate-terminated and/or epoxy terminated sulfur-containing prepolymer and a blocked amine curing agent such as a bis-oxazolidine. Upon exposure to water, the oxazolidine rings can hydrolyze to provide reactive amine and hydroxyl groups, which can react with the terminal isocyanate groups of the prepolymer to provide a cured sealant.

A bis-oxazolidine contains at least two oxazolidine rings coupled by a linker. Bis-oxazolidines are useful curing agents for polyurethanes and epoxies. Bis-oxazolidines having a urethane linking group are disclosed, for example, in U.S. Pat. Nos. 5,747,627 and 5,189,176; bis-oxazolidines having carbonateo linking groups are disclosed, for example, in European Patent No. 0 499 188 A1; bicyclic oxazolidines are disclosed, for example, in U.S. Pat. No. 5,126,421, and International Application Publication Nos. WO 96/08308 A1 and WO 99/07762 A1; and non-crystallizing bis-oxazolidines are disclosed, for example, in U.S. Pat. No. 5,189,176 and in U.S. Application Publication No. 2012/0277382 A1.

Divinyl Ether-Terminated Prepolymer and Acyl Halide

A moisture-curable composition can comprise a divinyl ether-terminated sulfur-containing prepolymer and an acyl halide such as benzoyl chloride. Upon exposure to moisture, the acyl halide undergoes hydrolysis to provide the corresponding carboxylic acid that in turn can catalyze the crosslinking of the divinyl ether-terminated prepolymer. An acyl halide can comprise benzoyl chloride and the corresponding acid catalyst is benzoic acid.

Divinyl ether-terminated sulfur-containing prepolymers can be prepared in a manner similar to that described for the synthesis of thiol-terminates sulfur-containing prepolymers in U.S. Application Publication Nos. 2004/0220327 and 2004/0152866, by reacting an excess of divinyl ethers with the polythiols.

Michael Acceptor-Terminated Prepolymers and Blocked Amine Catalyst

A moisture-curable composition can comprise a Michael acceptor-terminated sulfur-containing prepolymer comprising at least two Michael acceptor groups. a curing agent comprising at least two terminal groups reactive with Michael acceptor groups, and a blocked amine catalyst.

Sulfur-containing prepolymers comprising at least two Michael acceptor groups are disclosed, for example, in U.S. Application Publication No. 2013/0345371, 2015/0099858, and 2015/0119549, each of which is incorporated by reference in its entirety. Curing agents comprising at least two terminal groups reactive with Michael acceptor groups include, for example, polythiols, polyamines, and blocked polyamines. In compositions comprising a sulfur-containing prepolymers comprising at least two Michael acceptor groups and a polythiol curing agent, the composition may comprise a blocked amine catalyst such as a ketimine, enamine, oxazolidine, aldimine, and an imidazolidine.

A blocked amine catalyst can be unblocked in the presence of moisture to release an amine catalyst capable of catalyzing a Michael addition reaction. Examples of moisture-release blocked amine catalysts include ketimines, enamines, oxazolidines, aldimines, and imidazolidines. In the presence of moisture, the blocking group, e.g., the ketimine, enamine, oxazolidine, aldimine, or imidazolidine blocking group or groups reacts with water to provide a catalytic amine catalyst and a ketone or alcohol.

A moisture-released blocked amine catalyst can release a primary amine, a secondary amine, or a tertiary amine. A moisture-released blocked amine catalyst can comprise Vestamin® A139, which is a blocked cycloaliphatic diamine. An unblocked amine can comprise isophorone diamine (IPDA). In compositions comprising a moisture-released amine catalyst, the moisture released amine catalyst may comprise from 0.1 wt % to 4 wt % of the composition, from 0.5 wt % to 3 wt % of the composition, or from 1 wt % of the composition to 2 wt % of the composition.

Other

A moisture-curable composition provided by the present disclosure may contain latent water such as encapsulated water and/or sequestered water. The presence of a source of water within the curable composition that can be released during assembly can speed the rate of curing and/or increase the homogeneity of curing. Rapid curing can be desirable in certain applications such as in repair.

Systems that include latent water may benefit from controlled storage conditions such as low temperature storage to prevent or minimize release of water from the encapsulant. The water may be contained, for example, within a core/shell encapsulant, incorporated within a matrix-type encapsulant, and/or contained within a hydrogel.

A moisture-curable composition can include latent water sequestered, for example, in a super absorbent material such as a hydrogel. The water can be released from the super absorbent material upon application of energy such as thermal or mechanical energy to initiate or participate in the curing reaction. The hydrogel can be incorporated into the moisture-curable composition. Latent water can also include encapsulated water or water incorporated into a matrix encapsulant.

Providing a latent source of water within the sealant can facilitate the moisture-initiated curing of the reactive components in the composition. Initiation of the curing reaction of compositions provided by the present disclosure can occur upon exposure to atmospheric moisture after the barrier coating is compromised to expose the uncured sealant composition. The gaps between the surfaces of the parts to be sealed is small and moisture egress from the edges of the sealed surface exposed to moisture can be slow. In addition, being exposed to moisture the edges of the sealant composition will cure, further restricting moisture egress to internal surfaces.

It is desirable that latent water not diffuse into the uncured sealant during storage of the pre-coated part.

Sulfur-Containing Prepolymers

Moisture-curable compositions provided by the present disclosure include a sulfur-containing prepolymer. Suitable sulfur-containing prepolymers include polythioethers, polysulfides, sulfur-containing polyformals, and combinations of any of the foregoing. Sulfur-containing prepolymers are known to be useful in aerospace sealant applications, and in particular fuel tank sealant applications, where cured sealants prepared using the sulfur-containing prepolymers maintain acceptable properties such as adhesion, tensile strength, elongation, and hardness, following exposure to aviation fuel and/or high temperature.

The sulfur-containing prepolymers may be terminated with functional groups suitable for a particular curing chemistry. For example, the sulfur-containing prepolymers may be thiol-, polyalkoxysilyl-, epoxy-, isocyanate-, vinyl ether-, or Michael acceptor-terminated.

Polythioether Prepolymers

A polythioether prepolymer can comprise a polythioether having a backbone comprising the structure of Formula (1):

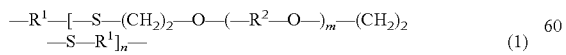

wherein,
each $R^1$ is independently selected from $C_{2-10}$ n-alkanediyl, $C_{3-6}$ branched alkanediyl, $C_{6-8}$ cycloalkanediyl, $C_{6-10}$ alkanecycloalkanediyl, $C_{6-8}$ heterocycloalkanediyl, —[(—CHR—)$_p$—X—]$_q$—(CHR)$_r$—, wherein each R is selected from hydrogen and methyl;

each $R^2$ is independently selected from $C_{2-10}$ n-alkanediyl, $C_{3-6}$ branched alkanediyl, $C_{6-8}$ cycloalkanediyl, $C_{6-14}$ alkanecycloalkanediyl, $C_{6-8}$ heterocycloalkanediyl, and —[(CH$_2$—)$_p$—X—]$_q$(CH$_2$)$_r$—;
each X is independently selected from O, S, and —NR—, wherein R is selected from hydrogen and methyl;
m is an integer from 0 to 50;
n is an integer ranging from 1 to 60;
p is an integer ranging from 2 to 6;
q is an integer ranging from 1 to 5; and
r is an integer ranging from 2 to 10.

In prepolymers of Formula (1), $R^1$ can be —[—(CHR)$_p$—X—]$_q$—(CHR)$_r$— wherein each X is independently selected from —O— and —S—. In prepolymers of Formula (1), $R^1$ can be —[—(CHR)$_p$—X—]$_q$—(CHR)$_r$—, where each X can be —O— or each X can be —S—.

In prepolymers of Formula (1), $R^1$ can be —[—(CH$_2$)$_p$—X—]$_q$—(CH$_2$)$_r$— wherein each X is independently selected from —O— and —S—. In prepolymers of Formula (1), $R^1$ can be —[—(CH$_2$)$_p$—X—]$_q$—(CH$_2$)$_r$—, where each X can be —O— or each X can be —S—.

In prepolymers of Formula (1), $R^1$ can be —[(CH$_2$—)$_p$—X—]$_q$—(CH$_2$)$_r$—, where p is 2, X is O, q is 2, r is 2, $R^2$ is ethanediyl, m is 2, and n is 9.

In prepolymers of Formula (1), each $R^1$ can be derived from dimercaptodioxaoctane (DMDO) or each $R^1$ can be derived from dimercaptodiethylsulfide (DMDS).

In prepolymers of Formula (1), each m can be independently an integer from 1 to 3; or each m can be the same and is 1, 2, or 3. In prepolymers of Formula (1), m can be 1 to 50, 2 to 40, and or 1 to 10.

In prepolymers of Formula (1), n can be an integer from 1 to 30, an integer from 1 to 20, an integer from 1 to 10, or an integer from 1 to 5. In addition, n may be any integer from 1 to 60.

In prepolymers of Formula (1), each p can be independently selected from 2, 3, 4, 5, and 6. In prepolymers of Formula (1), each p is the same and is 2, 3, 4, 5, or 6.

In prepolymers of Formula (1), each r can be selected from 2, 3, 4, 5, 6, 7, and 8.

In prepolymers of Formula (1), each q can be selected from 1, 2, 3, 4, and 5.

A polythioether prepolymer having a backbone structure of Formula (1) may be a thiol-terminated polythioether prepolymer.

A thiol-terminated polythioether may comprise a thiol-terminated polythioether of Formula (2a), a thiol-terminated polythioether of Formula (2b), and a combination thereof:

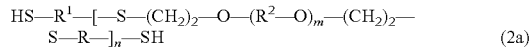

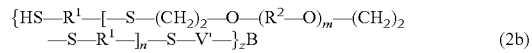

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and —[(CHR—)$_p$—X—]$_q$—(CHR—)$_r$—, wherein,
p is an integer from 2 to 6;
q is an integer from 1 to 5;
r is an integer from 2 to 10;
each R is independently selected from hydrogen and methyl; and
each X is independently selected from —O—, —S—, and —NR—, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and —[(CHR—)$_p$—X—]$_q$—(CHR—)$_r$—, wherein p, q, r, R, and X are as defined as for $R^1$;

m is an integer from 0 to 50;

n is an integer from 1 to 60;

B represents a core of a z-valent, polyfunctionalizing agent B(—V)$_z$ wherein, z is an integer from 3 to 6; and each V is a moiety comprising a terminal group reactive with a thiol; and each —V'— is derived from the reaction of —V with a thiol.

In prepolymers of Formula (2a) and Formula (2b), $R^1$ can be —[(CH$_2$—)$_p$—X—]$_q$—(CH$_2$)$_r$—, where p is 2, X is —O—, q is 2, r is 2, $R^2$ is ethanediyl, m is 2, and n is 2 to 30, 2 to 20, 2, to 10, or 9.

In prepolymers of Formula (2a) and Formula (2b), $R^1$ can be selected from $C_{2-6}$ alkanediyl and —[—(CHR)$_p$—X—]$_q$—(CHR)$_r$—.

In prepolymers of Formula (2a) and Formula (2b), $R^1$ can be —[—(CHR)$_p$—X—]$_q$—(CHR)$_r$—, and X is —O— or X is —S—. In prepolymers of Formula (2a) and Formula (2b), $R^1$ can be —[—(CH$_2$)$_p$—X—]$_q$—(CH$_2$)$_r$—, and X is —O— or X is —S—.

In prepolymers of Formula (2a) and Formula (2b), $R^1$ can be —[—(CHR)$_p$—X—]$_q$—(CHR)$_r$—, p is 2, r is 2, q is 1, and X is —S—; or p is 2, q is 2, r is 2, and X is —O—; and in certain embodiments, p is 2, r is 2, q is 1, and X is —O—. In prepolymers of Formula (2a) and Formula (2b), $R^1$ can be —[—(CH$_2$)$_p$—X—]$_q$—(CH$_2$)$_r$—, p is 2, r is 2, q is 1, and X is —S—; or p is 2, q is 2, r is 2, and X is —O—; or p is 2, r is 2, q is 1, and X is —O—.

In prepolymers of Formula (2a) and Formula (2b), $R^1$ can be —[—(CHR)$_p$—X—]$_q$—(CHR)$_r$—, and each R is hydrogen or, at least one R is methyl.

In prepolymers of Formula (2a) and Formula (2b), each $R^1$ can be the same, or at least one $R^1$ is different.

In prepolymers of Formula (2a) and Formula (2b), each m can be 1, 2, 3, or 4; m can be an integer from 1 to 10, from 1 to 6, or an integer from 1 to 4. Prepolymers of Formula (2a) and Formula (2b), m can be an integer from 2 to 10, from 2 to 6 or an integer from 2 to 4. Prepolymers of Formula (2a) and Formula (2b), m can be 1 to 50, 2 to 40, or 1 to 10.

In prepolymers of Formula (2a) and Formula (2b), n can be an integer from 1 to 30, an integer from 1 to 20, an integer from 1 to 10, or an integer from 1 to 5. In addition, n may be any integer from 1 to 60.

In prepolymers of Formula (2a) and Formula (2b), each p can be independently selected from 2, 3, 4, 5, and 6. In certain embodiments, each p is the same and is 2, 3, 4, 5, or 6.

In prepolymers of Formula (2a) and Formula (2b), each r can be selected from 2, 3, 4, 5, 6, 7, and 8.

In certain embodiments of Formula (2a) and Formula (2b), each q is selected from 1, 2, 3, 4, and 5.

In certain embodiments of polythioethers of Formula (2a) and Formula (2b), $R^1$ can be —(CH$_2$)$_2$—O—(CH$_2$)$_2$—O—(CH$_2$)$_2$—; $R^2$ is —(CH$_2$)$_2$—; m is 2; z is 3; B(—V)$_z$ is triallyl cyanurate having the structure:

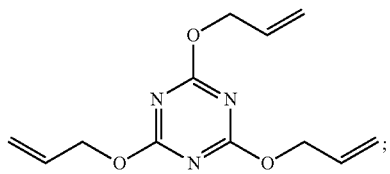 [SMILES: C=CCOc1nc(OCC=C)nc(OCC=C)n1]

z is 3; each —V is —O—CH$_2$—CH=CH$_2$; each —V'— is —O—(CH$_2$)$_3$—; and B has the structure:

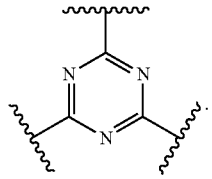 [SMILES: *c1nc(*)nc(*)n1]

Various methods can be used to prepare thiol-terminated polythioethers of Formula (2a) and Formula (2b). Examples of suitable thiol-terminated polythioethers, and methods for their production, are described in U.S. Pat. No. 6,172,179, which is incorporated by reference in its entirety. Such thiol-terminated polythioethers may be difunctional, that is, linear prepolymers having two terminal thiol groups, or polyfunctional, that is, branched prepolymers have three or more terminal thiol groups. Suitable thiol-terminated polythioethers are commercially available, for example, as Permapol® P3.1E, Permapol® L56086, or a combination thereof, available from PRC-DeSoto International Inc., Sylmar, Calif.

A thiol-terminated polythioether prepolymer may comprise a mixture of different polythioethers and the polythioethers may have the same or different functionality. A thiol-terminated polythioether may have an average functionality from 2 to 6, from 2 to 4, from 2 to 3, from 2.05 to 2.8, from 2.3 to 2.8, or from 2.05 to 2.5. For example, a thiol-terminated polythioether can be selected from a difunctional thiol-terminated polythioether, a trifunctional thiol-terminated polythioether, and a combination thereof.

A thiol-terminated polythioether can be prepared by reacting a polythiol and a diene such as a divinyl ether, and the amounts of the respective reactants used to prepare the polythioethers are chosen to yield terminal thiol groups. Thus, in some cases, (n or >n, such as n+1) moles of a polythiol, such as a dithiol or a mixture of at least two different dithiols and about 0.05 moles to 1 moles, such as 0.1 moles to 0.8 moles, of a thiol-terminated polyfunctionalizing agent may be reacted with (n) moles of a diene, such as a divinyl ether, or a mixture of at least two different dienes, such as at least two divinyl ethers. A thiol-terminated polyfunctionalizing agent can be present in the reaction mixture in an amount sufficient to provide a thiol-terminated polythioether having an average functionality of from 2.05 to 3, such as from 2.1 to 2.8, or from 2.1 to 2.6.

The reaction used to make a thiol-terminated polythioether may be catalyzed by a free radical catalyst. Suitable free radical catalysts include azo compounds, for example azobisnitrile compounds such as azo(bis)isobutyronitrile (AIBN); organic peroxides, such as benzoyl peroxide and t-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioethers may be produced by reacting a divinyl ether or mixtures of divinyl ethers with an excess of dithiol or a mixtures of dithiols.

Thus, a thiol-terminated polythioether may comprise the reaction product of reactants comprising:

(a) a dithiol of Formula (3):

wherein,
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $—[—(CHR)_p—X—]_q—(CHR)_r—$;
wherein,
each R is independently selected from hydrogen and methyl;
each X is independently selected from —O—, —S—, —NH—, and —N(—CH$_3$)—;
p is an integer from 2 to 6;
q is an integer from 1 to 5; and
r is an integer from 2 to 10; and (b) a divinyl ether of Formula (4):

wherein,
m is an integer from 0 to 50;
each $R^2$ is independently selected from $C_{1-10}$ alkanediyl, $C_{6-8}$ cycloalkanediyl, $C_{6-14}$ alkanecycloalkanediyl, and $—[(CHR—)_p—X—]_q—(CHR—)_r—$, wherein n, p, q, r, R, and X are as defined for Formula (1).

And, in certain embodiments, the reactants may comprise (c) a polyfunctional compound such as a polyfunctional compound B $—V)_z$, where B, —V, and z are as defined for Formula (2b).

Dithiols suitable for use in preparing thiol-terminated polythioethers include, for example, those having Formula (3), other dithiols disclosed herein, or combinations of any of the dithiols disclosed herein. A dithiol can have the structure of Formula (3):

wherein,
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $—[—(CHR)_p—X—]_q—(CHR)_r—$;
wherein,
each R is independently selected from hydrogen and methyl;
each X is independently selected from —O—, —S—, and —NR— wherein R is selected from hydrogen and methyl;
p is an integer from 2 to 6;
q is an integer from 1 to 5; and
r is an integer from 2 to 10.

In dithiols of Formula (3), $R^1$ can be $—[—(CHR)_p—X—]_q—(CHR)_r—$.

In dithiols of Formula (3), X can be selected from —O— and —S—, and thus $—[—(CHR)_p—X—]_q—(CHR)_r—$ in Formula (3) is $—[(CHR—)_p—O—]_q—(CHR)_r—$, $—[(CHR—)_p—S—]—(CHR)_r—$, $—[(CH_2—)_p—O—]_q—(CH_2)_r—$, or $—[(CH_2—)_p—]_s—S—]_q—(CH_2)_r—$. In dithiols of Formula (3), p and r are equal, such as where p and r are both two.

In dithiols of Formula (3), $R^1$ can be selected from $C_{2-6}$ alkanediyl and $—[—(CHR)_p—X—]_q—(CHR)_r—$.

In dithiols of Formula (3), $R^1$ can be $—[—(CHR)_p—X—]_q—(CHR)_r—$, and X is —O— or X is —S—. In dithiols of Formula (3), $R^1$ can be $—[—(CH_2)_p—X—]_q—(CH_2)_r—$, and X is —O— or X is —S—.

In dithiols of Formula (3, $R^1$ can be $—[—(CHR)_p—X—]_q—(CHR)_r—$, p is 2, r is 2, q is 1, and X is —S—; or p is 2, q is 2, r is 2, and X is —O—; or p is 2, r is 2, q is 1, and X is —O—. In dithiols 1 of Formula (3), $R^1$ can be $—[—(CH_2)_p—X—]_q—(CH_2)_r—$, p is 2, r is 2, q is 1, and X is —S—; or p is 2, q is 2, r is 2, and X is —O—; or p is 2, r is 2, q is 1, and X is —O—.

In dithiols of a dithiol of Formula (3), $R^1$ can be $—[—(CHR)_p—X—]_q—(CHR)_r—$, each R is hydrogen, or at least one R is methyl.

In dithiols of Formula (3), each $R^1$ can be derived from dimercaptodioxaoctane (DMDO) or each $R^1$ is derived from dimercaptodiethylsulfide (DMDS).

In dithiols of Formula (3), each p can be independently selected from 2, 3, 4, 5, and 6. In dithiols of Formula (3), each p can be the same and is 2, 3, 4, 5, or 6.

In dithiols of Formula (3), each r can be selected from 2, 3, 4, 5, 6, 7, and 8.

In dithiols of Formula (3), each q can be selected from 1, 2, 3, 4, and 5.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., $C_{1-6}$) alkyl group, a lower alkoxy group, and a hydroxy group. Suitable alkyl pendant groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (3), $R^1$ is $—[(CH_2—)_p—X—]_q—(CH_2)_r—$, wherein p is 2, r is 2, q is 1, and X is —S—); dimercaptodioxaoctane (DMDO) (in Formula (3), $R^1$ is $—[(CH_2—)_p—X—]_q—(CH_2)_r—$, wherein p is 2, r is 2, and X is —O—); and 1,5-dimercapto-3-oxapentane (in Formula (3), $R^1$ is $—[(CH_2—)_p—X—]_q—(CH_2)_r—$, wherein p is 2, r is 2, q is 1, and X is —O—). It is also possible to use dithiols that include both a heteroatom in the carbon backbone and a pendant alkyl group, such as a pendant methyl group. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

Suitable divinyl ethers for preparing thiol-terminated polythioethers include, for example, divinyl ethers of Formula (4):

where m is 0 to 50 and $R^2$ in Formula (4) is selected from $C_{2-6}$ n-alkanediyl, $C_{3-6}$ branched alkanediyl, $C_{6-8}$ cycloalkanediyl, $C_{6-10}$ alkanecycloalkanediyl, and $—[(—CH_2—)_p—O—]_q—(—CH_2—)_r—$, where p is an integer ranging from 2 to 6, q is an integer from 1 to 5, and r is an integer from 2 to 10. In certain embodiments of a divinyl ether of Formula (4), $R^2$ is $C_{2-6}$ n-alkanediyl, $C_{3-6}$ branched alkanediyl, $C_{6-8}$ cycloalkanediyl, $C_{6-10}$ alkanecycloalkanediyl, and in certain embodiments, $-[(CH_2-)_p-O-]_q-(CH_2-)_r-$.

Suitable divinyl ethers include, for example, compounds having at least one oxyalkanediyl group, such as from 1 to 4 oxyalkanediyl groups, i.e., compounds in which m in Formula (4) is an integer ranging from 1 to 4. In certain embodiments, m in Formula (4) is an integer ranging from 2 to 4. It is also possible to employ commercially available divinyl ether mixtures that are characterized by a non-integral average value for the number of oxyalkanediyl units per molecule. Thus, m in Formula (4) can also be a rational number values ranging from 0 to 10.0, such as from 1.0 to 10.0, from 1.0 to 4.0, or from 2.0 to 4.0, such as 2.5, which represents an average functionality.

Examples of suitable vinyl ethers include, divinyl ether, ethylene glycol divinyl ether (EG-DVE) ($R^2$ in Formula (4) is ethanediyl and m is 1), butanediol divinyl ether (BD-DVE) ($R^2$ in Formula (4) is butanediyl and m is 1), hexanediol divinyl ether (HD-DVE) ($R^2$ in Formula (4) is hexanediyl and m is 1), diethylene glycol divinyl ether (DEG-DVE) ($R^2$ in Formula (4) is ethanediyl and m is 2), triethylene glycol divinyl ether ($R^2$ in Formula (4) is ethanediyl and m is 3), tetraethylene glycol divinyl ether ($R^2$ in Formula (4) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxy groups, alkoxy groups, and amine groups.

Divinyl ethers in which $R^2$ in Formula (4) is $C_{3-6}$ branched alkanediyl may be prepared by reacting a polyhydroxy compound with acetylene. Examples of branched divinyl ethers include compounds in which $R^2$ in Formula (4) is an alkyl-substituted methanediyl group such as $-CH(-CH_3)-$, for which $R^2$ in Formula (4) is ethanediyl and m is 3 or an alkyl-substituted ethanediyl.

Other useful divinyl ethers include compounds in which $R^2$ in Formula (4) is polytetrahydrofuryl (poly-THF) or polyoxyalkanediyl, such as those having an average of about 3 monomer units.

Two or more types of dithiols and/or polyvinyl ether monomers of Formula (4) may be used. Thus, two dithiols of Formula (3) and one polyvinyl ether monomer of Formula (4), one dithiol of Formula (3) and two polyvinyl ether monomers of Formula (4), two dithiols of Formula (3) and two divinyl ether monomers of Formula (4), and more than two compounds of one or both Formula (3) and Formula (4), may be used to produce a variety of thiol-terminated polythioethers.

A polyvinyl ether monomer may comprise 20 mole percent to less than 50 mole percent of the reactants used to prepare a thiol-terminated polythioether, or 30 mole percent to less than 50 mole percent.

According to the present disclosure, relative amounts of dithiols and divinyl ethers can be selected to yield polythioethers having terminal thiol groups. Thus, a dithiol of Formula (3) or a mixture of at least two different dithiols of Formula (3), can be reacted with of a divinyl ether of Formula (4) or a mixture of at least two different divinyl ethers of Formula (4) in relative amounts such that the molar ratio of thiol groups to alkenyl groups is greater than 1:1, such as from 1.1:1.0 to 2.0:1.0.

The reaction between dithiols and divinyl ethers and/or polythiols and polyvinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. The catalyst does not comprise acidic or basic compounds, and does not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts include alkyl peroxides, such as t-butyl peroxide. The reaction may also be effected by irradiation with ultraviolet light either with or without a cationic photoinitiating moiety.

Thiol-terminated polythioethers provided by the present disclosure may be prepared by combining at least one dithiol of Formula (3) and at least one divinyl ether of Formula (4) followed by addition of an appropriate catalyst, and carrying out the reaction at a temperature from 30° C. to 120° C., such as 70° C. to 90° C., for a time from 2 hours to 24 hours, such as from 2 hours to 6 hours.

As disclosed herein, thiol-terminated polythioethers may comprise a polyfunctional polythioether, i.e., may have an average functionality of greater than 2.0. Suitable polyfunctional thiol-terminated polythioethers include, for example, those having the structure of Formula (2b):

{HS—$R^1$—[—S—$(CH_2)_2$—O—$(R^2$—O$)_m(CH_2)_2$— S—$R^1$—$]_n$—S—V'—$\}_z$B 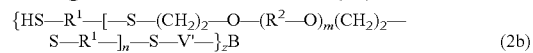 (2b)

wherein z has an average value of greater than 2.0, and, in certain embodiments, a value between 2 and 3, a value between 2 and 4, a value between 3 and 6, and in certain embodiments, is an integer from 3 to 6.

Polyfunctionalizing agents suitable for use in preparing such polyfunctional thiol-terminated polythioethers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed, for example, in U.S. Application Publication No. 2010/0010133, which is incorporated by reference in its entirety, and isocyanurates as disclosed, for example, in U.S. Application Publication No. 2011/0319559, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, polythioethers provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

Polysulfide Prepolymers

Examples of suitable polysulfides are disclosed, for example, in U.S. Pat. Nos. 4,623,711; 6,172,179; 6,509,418; 7,009,032; and 7,879,955, each of which is incorporated by reference in its entirety.

A polysulfide refers to a prepolymer that contains one or more polysulfide linkages, i.e., —$S_x$— linkages, where x is from 2 to 4, in the prepolymer backbone and/or in pendant positions on the prepolymer chain. A polysulfide prepolymer may have two or more sulfur-sulfur linkages. Suitable polysulfide prepolymers are commercially available, for example, from Akzo Nobel and Toray Fine Chemicals under the names Thiokol-LP® and Thioplast®. Thioplast® products are available in a wide range of molecular weights ranging, for example, from less than 1,100 Daltons to over 8,000 Daltons, with molecular weight being the average molecular weight in grams per mole. In some cases, the polysulfide has a number average molecular weight of 1,000 Daltons to 4,000 Daltons. The crosslink density of these products can also vary, depending on the amount of cross-linking agent used. The —SH content, i.e., thiol or mercaptan content, of these products can also vary. The mercaptan content and molecular weight of the polysulfide prepolymer can affect the cure speed of the prepolymer, with cure speed increasing with molecular weight.

A sulfur-containing prepolymer may comprise a polysulfide prepolymer selected from a Thiokol-LP® polysulfide, a Thioplast® polysulfide, and a combination thereof, such as Thioplast® G131, Thioplast® G21 and a combination thereof.

Sulfur-Containing Polyformal Prepolymers

Sulfur-containing polyformal prepolymers including thiol-terminated sulfur-containing polyformal prepolymers useful in aerospace sealant applications are disclosed, for example, in U.S. Application Publication No. 2012/0234205 and in U.S. Application Publication No. 2012/0238707, each of which is incorporated by reference in its entirety.

Backbone-Modified Sulfur-Containing Prepolymers

Sulfur-containing prepolymers also include polythioether, polysulfide, and/or sulfur-containing polyformals in which modifying segments are included within the backbone of the sulfur-containing prepolymer. For example, prepolymers in which urethane segments are incorporated into the sulfur-containing prepolymer backbone are disclosed in U.S. application Ser. No. 14/200,687 filed on Mar. 7, 2014; prepolymers in which sulfone or bis(sulfonyl)alkanol segments are incorporated into the sulfur-containing prepolymer backbone are disclosed in U.S. Application Publication Nos. 2014/0275461 and 2014/0378650; and prepolymers in which metal chelating segments are incorporated into the prepolymer backbone are disclosed in U.S. Application Publication Nos. 2014/0275474; each of which is incorporated by reference in its entirety. Incorporating modifying segments into the backbone of the sulfur-containing prepolymer can affect properties of a cured sealant prepared using the prepolymer such as flexibility and adhesion.

Terminal-Modified Sulfur-Containing Prepolymer

Sulfur-containing prepolymers provided by the present disclosure include reactive functional groups suitable for a particular curing chemistry. For example, the sulfur-containing prepolymers may be thiol-, polyalkoxysilyl-, epoxy-, isocyanate-, epoxy-, vinyl ether-, or Michael acceptor-terminated.

Terminal-modified sulfur-containing prepolymers may be adapted for use with certain curing chemistries by modifying a thiol-terminated sulfur-containing prepolymer with suitable reactive functional groups. Examples of suitable reactive terminal groups include polyalkoxysilyl groups, epoxy groups, isocyanate groups, vinyl ether groups, and Michael acceptor groups, and such prepolymers are referred to as terminal-modified sulfur-containing prepolymers.

Terminal-modified sulfur-containing prepolymers may be prepared by reacting a thiol-terminated sulfur-containing prepolymer with a compound having a group that is reactive with a thiol group and a reactive group such as a polyalkoxysilyl group, an epoxy group, an isocyanate group, a vinyl ether group, or a Michael acceptor group.

Methods of preparing terminal-modified sulfur-containing polyformal prepolymers are disclosed in U.S. Application Publication Nos. 2012/0238707 and 2012/0234255, each of which is incorporated by reference in its entirety. The methods for synthesizing terminal-modified sulfur-containing polyformal prepolymers from a corresponding thiol-terminated sulfur-containing polyformal prepolymers described in these applications can be adapted to prepare terminal-modified polythioethers, polysulfides, and other terminal-modified sulfur-containing prepolymer.

A terminal-modified sulfur-containing prepolymer can be derived from a polythioether having a backbone of Formula (1), or a thiol-terminated polythioether comprising a thiol-terminated polythioether selected from a thiol-terminated polythioether of Formula (2a), a thiol-terminated polythioether of Formula (2b), and a combination thereof.

The preparation of terminal-modified sulfur-containing polythioethers is known in the art. For example, isocyanate-terminated polythioethers are disclosed in U.S. application Ser. No. 14/200,687 filed on Mar. 7, 2014, polyalkoxysilyl-terminated polythioethers are disclosed in U.S. application Ser. No. 14/200,687 filed on Mar. 7, 2014, alkenyl-terminated polythioethers are disclosed in U.S. Application Publication No. 2006/0270796; and epoxy-terminated polythioethers are disclosed in U.S. Application Publication No. 2005/0010003, each of which is incorporated by reference in its entirety.

Encapsulated Water or Catalyst

Moisture-curable compositions provided by the present disclosure can contain encapsulated water or and/an encapsulated catalyst. Examples of suitable encapsulants include, for example, matrix encapsulants, core/shell encapsulants and hydrogels. In the sealant systems provided by the present disclosure it is desirable that the encapsulants release the water and/or catalyst during assembly of the part such that, for example, the integrity of the encapsulant is compromised by the applied mechanical stress or by increased temperature generated during assembly.

Matrix Encapsulation

A controlled release moisture cure catalyst can comprise a matrix encapsulant. Matrix encapsulation is a process by which droplets or particles of liquid or solid material are trapped among side chains of a crystalline or semi-crystalline polymer. With increased temperature, the crystalline polymer becomes amorphous and releases the droplets or particles into the medium. Matrix encapsulants provided by the present disclosure may comprise a crystalline matrix material incorporating droplets or particles comprising a moisture cure catalyst. Thus, the rate of reaction is to some extent controlled by thermally dependent diffusion of the moisture cure catalyst from the crystalline polymer. The crystalline polymers may have a sharp well-defined melting point or may exhibit a melting point range. The use of waxy polymers for matrix encapsulation of catalysts is disclosed in U.S. Application Publication No. 2007/0173602.

Examples of suitable matrix encapsulants include Intelimer® polymers (Air Products), such as Intelimer® 13-1 and Intelimer® 13-6. The properties of Intelimer® polymers is disclosed, for example, in Lowry et al., Cure evaluation of Intelimer® latent curing agents for thermoset resin applications, presented at the Thermoset Resin Formulators Association Meeting, Chicago, Ill., Sep. 15-16, 2008.

A matrix encapsulant may be selected to release the contents following a brief high temperature exposure such as for less than 10 minutes, less than 5 minutes, or less than 2 minutes. During this brief temperature excursion, the content is released from the matrix and diffuse into the reactive sulfur-containing prepolymer and optionally a curing agent. The composition may be heated during the curing process or may be left at ambient temperature. When left at ambient temperature, the composition may cure in less than 2 hours, in less than 4 hours, or in less than 6 hours.

Water or catalyst may be incorporated into a matrix encapsulant by blending at a temperature above the melt temperature of the matrix encapsulant, rapidly cooling the mixture, and grinding the solid to a powder. The average particle size can be less than 200 µm, less than 150 µm, less than 100 µm, less than 50 µm, or less than 25 µm.

A moisture-curable composition may comprise from 0.1 wt % to 25 wt %, from 1 wt % to 15 wt %, or from 5 wt % to 10 wt % of a matrix encapsulant. This correlates to about 0.01 wt % to 2 wt %, from 0.05 wt % to 1.5 wt %, or from 0.5 wt % to 1 wt % of an amine catalyst.

A matrix encapsulant suitable for use in compositions provided by the present disclosure comprises a ratio (wt %/wt %) of wt % a moisture cure catalyst to wt % matrix polymer from 1 to 15, from 2 to 10, or from 5 to 8.

Core-Shell Encapsulation

Other suitable controlled release encapsulation systems include microencapsulation such as core/shell encapsulants and inclusion catalysts.

Hydrogels

Moisture-curable compositions provided by the present disclosure may comprise a hydrogel or other water absorbent material. Hydrogels can be described as three-dimensional cross-linked hydrophilic polymer networks capable of swelling or de-swelling reversibly in water and retaining a large volume of liquid the swollen state. Hydrogels can be designed with controllable responses as to shrink or expand with can changes in external environmental conditions. For example, a hydrogel can undergo a volume transition in response to a variety of physical and chemical stimuli, where the physical stimuli include temperature, a electric or magnetic field, light, pressure, and sound, while the chemical stimuli include pH, solvent composition, ionic strength, and molecular species.

A hydrogel can be incorporated into a moisture curable composition in a dried form and water incorporated into the hydrogel by exposing the composition to atmospheric moisture. The hydrogel can sequester the water until released when physical stress is applied to the composition during assembly of a part.

Uses

Compositions provided by the present disclosure can be used as a pre-applied sealant layer on a part. Compositions containing a sulfur-containing prepolymer provided by the present disclosure are useful in aerospace sealant applications. The compositions can be used in conjunction with a pre-applied sealant system that includes a part to be sealed, a layer of the sealant composition of the present disclosure overlying at least a portion of the part, and a barrier coating overlying the moisture curable sealant layer.

The part can be, for example, a fastener, a panel, a rivet, a screw, an insert, or any other suitable part in which the interface between the part and an adjacent surface is to be sealed. It is desirable that during assembly a mechanical force is applied to the surface of the part to be sealed. The mechanical force can be applied, for example, by impact, by compression, by torque, or a combination of any of the foregoing.

A layer of a moisture-curable composition provided by the present disclosure can be applied to at least a portion of the part using any suitable method such as, for example, dipping, spraying, or painting. A portion of a part that will not be coated can be masked and the composition applied to the non-masked surface of the part. The layer can be characterized by a thickness from 0.5 mils to 5 mils. The thickness and location of the moisture-curable sealant layer on the part can be selected to seal the assembled surfaces, prevent or minimize extrusion of the sealant onto the inner and/or outer surfaces of the part. It can be appropriate to leave gaps between sections of a part that are pre-coated to facilitate extrusion of sealant internally along the joint and thereby minimize the potential for extrusion to external surfaces of the part.

After the curable sealant layer is applied to at least a portion of the surface of the part, a barrier coating can be applied over the curable sealant layer. The barrier coating protects the coating from moisture, mechanically protects the curable sealant layer during storage and handling, and can be mechanically compromised during assembly to expose the underlying curable coating to atmospheric moisture. The barrier coating can also serve to retain the curable sealant layer, which it is a viscous liquid. A cured barrier coating can be characterized, for example, by a moisture transmission rate of less than 20 $g/m^2/day$, less than 4 $g/m^2/day$, or less than 0.1 $g/m^2/day$.

Any suitable barrier coating may be used. Examples of suitable barrier coatings are disclosed in U.S. Application Publication Nos. 2012/0121359 and 2012/0168055. A barrier coating can be, for example, frangible such that it breaks apart when stress is applied. It can be desirable that the barrier coating not be incorporated into the cured sealant, and that it be extruded from between the sealing surfaces to an external surface of a part during assembly.

A barrier coating can be UV-curable. Examples of suitable UV-curable barrier coatings include acrylate-based systems including, for examples epoxy acrylates, urethane acrylates, polyester, acrylates, polyether acrylates, amine modified polyether acrylates, acrylic acrylates, or combinations of any of the foregoing. A barrier coating of a moisture-curable composition provided by the present disclosure can be applied to at least a portion of the part using any suitable method such as, for example, dipping, spraying, or painting. A portion of a part that will not be coated can be masked and the composition applied to the non-masked surface of the part. Following application to the curable coating, the barrier coating can be exposed to UV radiation to cure the barrier coating, forming a water-impermeable mechanical seal over the moisture-curable coating. A barrier coating can be characterized by a thickness from 0.5 mils to 5 mils, from 0.5 mils to 4 mils, or from 1 mil to 4 mils. Other coating thicknesses may be used as suitable for a particular application.

Application of curable sealant systems provided by the present disclosure to parts can be done using an automated process. The integrity and properties of the applied system can also be automatically inspected.

Assembly

Parts coated with moisture-curable sealant system can be stored for a suitable period of time such as from weeks to months, or longer. At the time of use, a coated part such as a fastener is assembled and during the assembly process the barrier coating is mechanically fractured to expose the underlying curable sealant layer to atmospheric moisture. The mechanical force imparted to the sealant system during assembly can also compromise a latent-release structure to release a latent catalyst or latent water into the curable composition to initiate or augment the curing reaction.

As can be appreciated, the assembly of parts coated with the curable sealant systems provided by the present disclosure facilitates assembly including reducing assembly time and improving reproducibility.

Other Components

Compositions provided by the present disclosure may comprise one or more additional components suitable for use in aerospace sealants and depend at least in part on the desired performance characteristics of the cured sealant under conditions of use.

A composition provided by the present disclosure may comprise an ethylenically unsaturated silane, such as, for example, a sulfur-containing ethylenically unsaturated silane, which can improve the adhesion of a cured sealant to a metal substrate. As used herein, the term sulfur-containing ethylenically unsaturated silane refers to a molecular compound that comprises, within the molecule, (i) at least one sulfur (S) atom, (ii) at least one, in some cases at least two, ethylenically unsaturated carbon-carbon bonds, such as a carbon-carbon double bonds (C=C); and (iii) at least one silane group, —Si(—R)$_m$(—OR)$_{3-m}$, where each R is independently selected from hydrogen, alkyl, cycloalkyl, aryl, and others, and m is selected from 0, 1, and 2. Examples of ethylenically unsaturated silanes are disclosed in U.S. Publication No. 2012/0040104, which is incorporated by reference in its entirety.

Compositions provided by the present disclosure may comprise one or more than one adhesion promoters. A one or more additional adhesion promoter may be present in amount from 0.1 wt % to 15 wt % of a composition, less than 5 wt %, less than 2 wt %, or less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art. An adhesion promoter may comprise T-1601, available from PRC-DeSoto International.

Compositions provided by the present disclosure may comprise one or more different types of filler. Suitable fillers include those commonly known in the art, including inorganic fillers, such as carbon black and calcium carbonate (CaCO$_3$), silica, polymer powders, and lightweight fillers. Suitable lightweight fillers include, for example, those described in U.S. Pat. No. 6,525,168. A composition may include 5 wt % to 60 wt % of the filler or combination of fillers, 10 wt % to 50 wt %, or from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

Compositions provided by the present disclosure may include low density filler particles. As used herein, low density, when used with reference to such particles means that the particles have a specific gravity of no more than 0.7, no more than 0.25, or no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 microns to 100 microns and a specific gravity of 0.25 (Eccospheres®). Other examples include alumina/silica microspheres having particle sizes in the range of 5 microns to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). Compositions provided by the present disclosure may include lightweight filler particles comprising an exterior surface coated with a thin coating, such as those described in U.S. Publication No. 2010/0041839 at paragraphs [0016]-[0052], the cited portion of which is incorporated herein by reference.

A composition may comprises less than 2 wt % of a light weight filler, less than 1.5 wt %, less than 1.0 wt %, less than 0.8 wt %, less than 0.75 wt %, less than 0.7 wt % or less than 0.5 wt % of a composition, where wt % is based on the total dry solids weight of the composition.

Compositions provided by the present disclosure may comprise at least one filler that is effective in reducing the specific gravity of the composition. The specific gravity of a composition can be from 0.8 to 1, from 0.7 to 0.9, from 0.75 to 0.85, or is about 0.8. The specific gravity of a composition can be less than about 0.9, less than about 0.8, less than about 0.75, less than about 0.7, less than about 0.65, less than about 0.6, or less than about 0.55.

A composition may also include any number of additives as desired. Examples of suitable additives include plasticizers, pigments, surfactants, adhesion promoters, thixotropic agents, fire retardants, masking agents, and accelerators (such as amines, including 1,4-diaza-bicyclo[2.2.2]octane, DABCO®), and combinations of any of the foregoing. When used, the additives may be present in a composition in an amount ranging, for example, from about 0 wt % to 60 wt %. Additives may be present in a composition in an amount ranging from about 25 wt % to 60 wt %.

Properties

For aerospace sealant applications it can be desirable that a sealant meet the requirements of Mil-S-22473E (Sealant Grade C) at a cured thickness of 20 mils, exhibit an elongation greater than 200%, a tensile strength greater than 250 psi, and excellent fuel resistance, and maintain these properties over a wide temperature range from −67° F. to 360° F. In general, the visual appearance of the sealant is not an important attribute. Prior to cure, it is desirable that the mixed components have a useful working time or pot life of at least 24 hours and have a cure time within 24 hours of the pot life. Useful working time or pot life refers to the time period the composition remains workable for application at ambient temperatures after the catalyst is released. Compositions provided by the present disclosure, following release of the catalytic amine, have a pot life of at least 6 hours, at least 12 hours, at least 18 hours, at least 24 hours, or more than 24 hours. Compositions provided by the present disclosure cure in less than 6 hours after the pot life, in less than 12 hours, in less than 18 hours, in less than 24 hours, in less than 48 hours, or in less than 72 hours after useful working time.

Cured compositions disclosed herein, such as cured sealants, exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated by reference. It is also desirable that, when cured, compositions of the present disclosure used in aviation and aircraft applications exhibit a percent volume swell not greater than 25% following immersion for one week at 60° C. (140° F.) and ambient pressure in JRF Type I. Other properties, ranges, and/or thresholds may be appropriate for other sealant applications.

Compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28%±1% by volume; cyclohexane (technical): 34%±1% by volume; isooctane: 38%±1% by volume; and tertiary dibutyl disulfide: 1%±0.005% by volume (see AMS 2629, issued Jul. 1, 1989, § 3.1.1 etc., available from SAE (Society of Automotive Engineers)).

Compositions provided by the present disclosure provide a cured product, such as a sealant, exhibiting a tensile elongation of at least 100% and a tensile strength of at least 400 psi when measured in accordance with the procedure described in AMS 3279, § 3.3.17.1, test procedure AS5127/1, § 7.7.

A cured sealant comprising a composition provided by the present disclosure can meet or exceed the requirements for aerospace sealants as set forth in AMS 3277.

Apertures, including apertures of aerospace vehicles, sealed with compositions provided by the present disclosure are also disclosed.

EXAMPLES

Embodiments provided by the present disclosure are further illustrated by reference to the following examples, which describe compositions, sealants, and systems provided by the present disclosure. It will be apparent to those skilled in the art that many modifications, both to materials and methods, may be practiced without departing from the scope of the disclosure.

Example 1

A moisture-curable sealant composition provided by the present disclosure is applied to a part such as threads of a screw. The applied sealant layer is about 0.5 mils to 5 mils thick. A barrier coating is then applied over the moisture-curable sealant composition to provide a moisture barrier. The barrier coating is UV cured. The coated part is stored for later use.

At the time of use the pre-coated part is assembled using standard procedures. The assembly process applies mechanical stress to the barrier coating sufficient to compromise the barrier coating, exposing the moisture-curable sealant composition to atmospheric moisture. In embodiments in which the moisture-curable sealant composition contains a source of latent water, the latent water can be released by the applied mechanical stress.

Excess uncured sealant extruded to the surfaces of the part can be removed. The activated sealant is allowed to cure, sealing the assembled part.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A sealant system comprising:
an uncured moisture-curable sealant composition comprising:
a vinyl ether-terminated sulfur-containing prepolymer; and
a blocked benzoic acid catalyst; and
a frangible barrier coating overlying the uncured moisture-curable sealant composition.

2. The sealant system of claim 1, wherein the blocked benzoic acid catalyst comprises benzoyl chloride.

3. The sealant system of claim 1, wherein the vinyl ether-terminated sulfur-containing prepolymer comprises a vinyl ether-terminated polythioether prepolymer.

4. The sealant system of claim 3, wherein the vinyl ether-terminated polythioether prepolymer comprises a backbone comprising the structure of Formula (1):

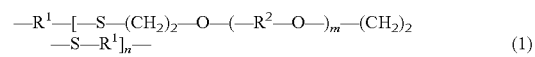

wherein,
each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, $C_{6-8}$ heterocycloalkanediyl, and a $-[(-CHR-)_p-X-]_q-(CHR)_r-$ group, wherein each R is selected from hydrogen and methyl;

each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, $C_{6-8}$ heterocycloalkanediyl, and a $-[(-CH_2-)_p-X-]_q-(CH_2)_r-$ group;

each X is independently selected from O, S, and —NR—, wherein R is selected from hydrogen and methyl;

m ranges from 0 to 50;
n is an integer ranging from 1 to 60;
p is an integer ranging from 2 to 6;
q is an integer ranging from 1 to 5; and
r is an integer ranging from 2 to 10.

5. The sealant system of claim 4, wherein,
$R^1$ is $-(CH_2)_2-O-(CH_2)_2-O-(CH_2)_2-$;
$R^2$ is $-(CH_2)_2-$;
m is 2; and
z is 3.

6. The sealant system of claim 1, wherein the uncured moisture curable sealant composition is formulated as a sealant.

7. A coated part, comprising the sealant system of claim 1 applied to at least a portion of a part.

8. The coated part of claim 7, wherein;
the part is a fastener comprising a shank; and
the sealant coating overlies at least a portion of the fastener.

9. A method of providing a coated part, comprising:
applying a moisture-curable sealant composition to at least a portion of a surface of a part, wherein the moisture-curable sealant composition comprises:
a vinyl ether-terminated sulfur-containing prepolymer; and
a blocked benzoic acid catalyst; and
applying a frangible barrier coating over the moisture-curable sealant composition, wherein the frangible barrier coating is configured to expose the moisture-curable sealant composition to atmospheric moisture during assembly.

10. The sealant system of claim 1, wherein the uncured moisture-curable sealant composition comprises a latent source of water.

11. The sealant system of claim 10, wherein the latent source of water comprises encapsulated water, sequestered water, or a combination thereof.

12. The sealant system of claim 10, wherein the latent source of water comprises water incorporated into a core/shell encapsulant, water incorporated into a matrix encapsulant, water incorporated into a hydrogel, or a combination of any of the foregoing.

13. The sealant system of claim 1, wherein the uncured moisture-curable sealant comprises an acyl halide.

14. The sealant system of claim 1, wherein the vinyl ether-terminated sulfur-containing prepolymer comprises a polythioether, a polysulfide, a sulfur-containing polyformal, or a combination of any of the foregoing.

15. The sealant system of claim 1, wherein the frangible barrier coating comprises a UV-curable coating.

16. A method of sealing a part, comprising assembling the coated part of claim 7 to cause the frangible barrier coating to fracture, thereby exposing the uncured moisture-curable sealant composition to atmospheric moisture, and curing the moisture-curable sealant composition.

17. The method of claim 16, wherein,
the uncured moisture-curable sealant composition comprises a latent source of water; and
assembling the coated part causes water to be released from the latent source of water.

18. The method of claim 17, wherein the latent source of water comprises water incorporated into a core/shell encapsulant, water incorporated into a matrix encapsulant, water incorporated into a hydrogel, or a combination of any of the foregoing.

19. An aerospace vehicle comprising a part sealed with the sealant system of claim 1.

20. A part sealed with the sealant system of claim 1.

* * * * *